T. W. PITCHER.
WATER HEATER.
APPLICATION FILED SEPT. 20, 1906.
965,536.
Patented July 26, 1910.
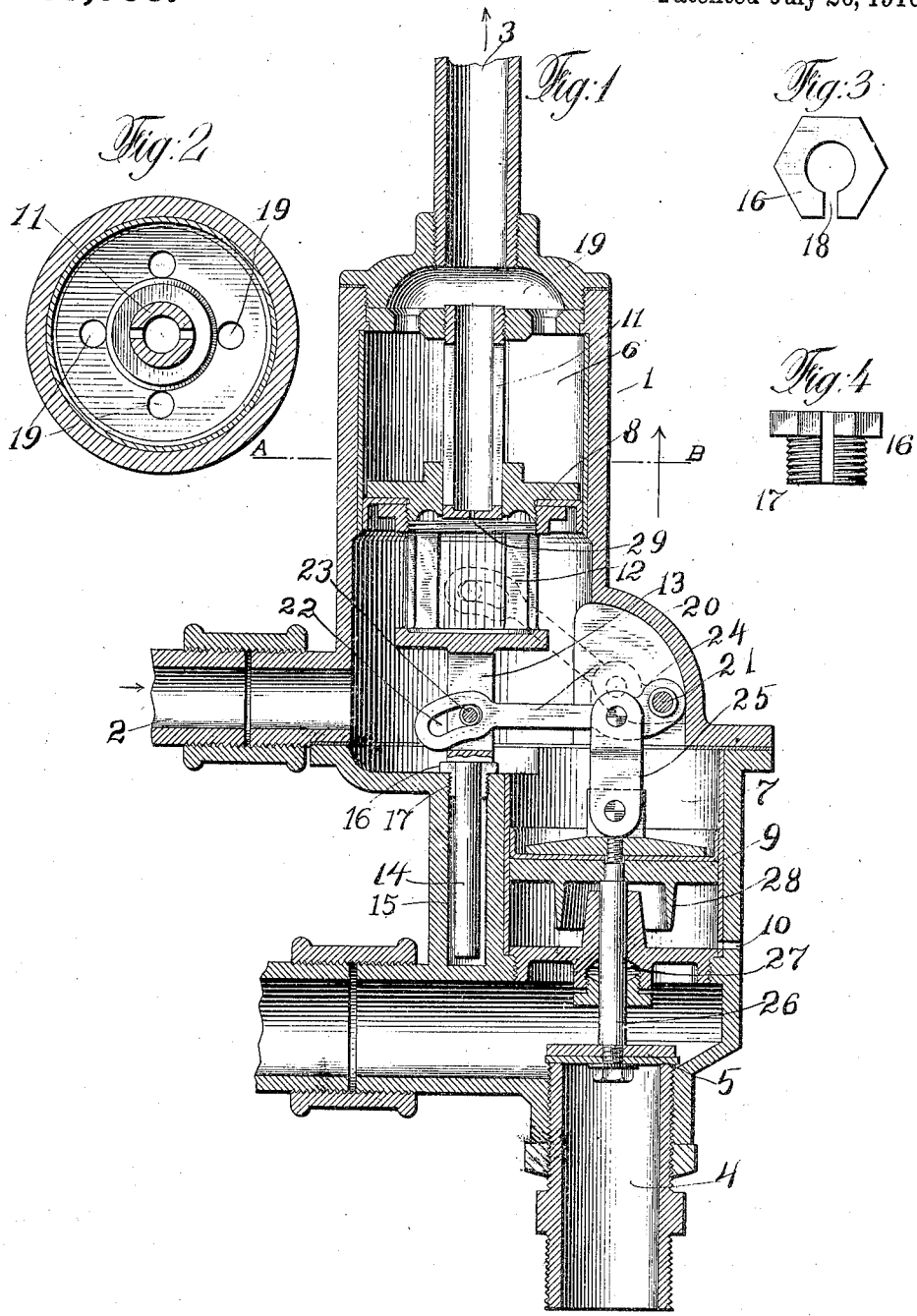

UNITED STATES PATENT OFFICE.

THOMAS WALTER PITCHER, OF BAYONNE, NEW JERSEY, ASSIGNOR TO AUTOMATIC WATER HEATER COMPANY, A CORPORATION OF ILLINOIS.

WATER-HEATER.

965,536.

Specification of Letters Patent.   Patented July 26, 1910.

Application filed September 20, 1906.   Serial No. 335,365.

*To all whom it may concern:*

Be it known that I, THOMAS WALTER PITCHER, a subject of the King of Great Britain, and a resident of Bayonne, Hudson county, State of New Jersey, have invented certain new and useful Improvements in Water-Heaters, of which the following is a specification.

The invention relates to water heaters and particularly to valve mechanism for automatically controlling the supply of fuel to water heaters by the flow of water therethrough.

Objects of the invention are to provide a compact, simple mechanism by which the fuel valve may be automatically and reliably controlled by the pressure of the water supply to the heater or by slight differences in pressure produced by the flow of water through the heater; to provide such a mechanism which is reliable and positive in its action and wherein the parts are conveniently and compactly arranged and so as to assure their performing their movements and effecting their functions accurately and reliably, and further so as to have the parts protected from disarrangement or damage. These and other objects of invention will in part be obvious and will in part more fully appear herein.

The invention consists in the novel parts, improvements, arrangements and combinations herein shown and described.

The accompanying drawings, referred to herein and forming a part hereof, illustrate one embodiment of the invention, the same serving in connection with the description herein to explain the principles of the invention.

Of the drawings: Figure 1 is a vertical central section of a valve mechanism constructed in accordance with the principles of the invention; Fig. 2 is a sectional view on the line A—A of Fig. 1; and Figs. 3 and 4 are detail views.

Referring to the embodiment illustrated by way of example in the accompanying drawings, 1 indicates a casing provided with a water inlet 2 and a water outlet 3. Conveniently located with reference to the said casing is a fuel conveyer, shown herein in the form of a pipe 4, having a fuel controlling valve 5 of suitable and convenient form. The casing 1 is connected with a water system on either side of the heater and said casing has connected therewith means for controlling, through the action of the valve 5, the flow of fuel through the pipe 4 so that the amount of fuel supplied to the heater may be substantially proportionate to the amount of water passing therethrough. According to certain features of the invention there are provided within the casing two piston chambers out of alinement with each other but having their axes substantially parallel. One of the piston chambers, indicated by the reference numeral 6, is in the line of water flow between the inlet and outlet passages, and has a piston 8 therein constructed so as to receive movement from the water flow, the amount of movement being substantially proportional to the amount of water flow. The other piston chamber, indicated by the reference numeral 7, is also provided with a piston 9, having the water pressure upon one side only. The piston chamber 7 is accordingly constructed with one end in communication with the casing 1 and with the other end in communication with the atmosphere, the aperture 10 being provided for this purpose.

According to certain features of the invention it is contemplated, in connection with the general arrangement of piston chambers just described, to have the pistons with the same effective area subject to the water pressure, the piston which is in the line of water flow and which serves to open the fuel controlling valve having a greater movement to produce a given movement of the fuel controlling valve than the other piston, which operates to close the fuel controlling valve. According to certain other features of the invention it is contemplated also to provide connections between the two pistons which are located entirely within the casing. The said features, as will be understood, may be used together in an embodiment or separately, if desired. The arrangements specified possess the advantages, together with other advantages, of giving an accurate and reliable movement of the parts, of permitting the connections being of a simple, convenient and effective form, and also preserves the connections from intentional or unintentional damage or disarrangement.

Other features of the invention will be set forth herein.

Means are provided for giving the piston 8 a movement substantially proportional to the water flow at any given time, and in the form of such means illustrated herewith, there is shown located within the piston chamber 6, and arranged axially thereof, a slotted tube 11 upon which the piston 8 slides in its movement, the piston closing the piston chamber about the slotted tube. The piston slides along the slotted tube when moved by the pressure of the water flow, the amount of movement imparted to the piston being substantially proportional to the amount of the water flow. A series of passages 19 are arranged in the end of the piston chamber 6, about the slotted tube 11 in order to provide communication with the water outlet 3. A small water passage 29 in the closed end of the tube 11, or the equivalent of this, may be provided and is desirable in order to prevent a leaky faucet somewhere on the line from causing the opening of the fuel valve. In other words, it is desirable, as it is well known in this art, to provide a leak past the motor piston to prevent the apparatus from operating except when a substantial flow of water is established; otherwise, the fuel may be turned on when there is not a substantial flow of water and the heater thus injured or destroyed. Suitable devices for further guiding the piston, permitting free access of the water to the piston and tube, and for constituting a part of the connections to the other piston are provided in this embodiment. The form of such devices herein shown comprises an open frame 12 fixed to the piston 8, a yoke 13 attached to the said frame and a rod 14 attached to the yoke. The rod 14 plays in a cylindrical compartment 15 closed except at the end where it communicates with the casing 1. Means are provided for guiding the rod 14 as it reciprocates in the compartment 15, and at the same time furnishing a free passage between the compartment and the casing. The illustrated form of such means comprises a bushing 16 having a thread 17 adapted to take into a corresponding thread at the mouth of the compartment 15. The said bushing is provided with a slot 18 which affords a communicating channel between the compartment and the casing.

In accordance with certain features of the invention, and as hereinbefore indicated, the connections between the pistons 8 and 9 are entirely within the casing 1. As herein shown they comprise a lever 20 pivoted at a suitable point within the casing and having at its free end a slot 22, preferably curved, engaging with a pin 23 fixed in the yoke 13. Pivoted at a suitable point 24 upon the lever 20 is a link 25 connected to the piston 9. In the present embodiment the piston 9 is shown as having a rigid, direct connection to the fuel controlling valve 5, said connection comprising a stem 26 suitably connected to the piston and the valve. The said stem passes through the part of the wall of the casing which separates the gas chamber connected with the pipe 4 from the piston chamber 7. This wall is provided with an upstanding perforated boss having a stuffing box 27.

For the purpose of preventing any water which might leak around the piston 9 from entering along the stem 26 through the stuffing box 27 into the pipe 4, a suitable drip guard is provided shown herein in the form of an annular flange 28 integral with the piston 9 arranged about the stem 26. The outside end of the stuffing box, as will be seen from the drawings, is raised above the floor or outer surface of the pipe 4 at this point, so that any drippings from the piston would follow the outside of the flange 28 and dropping upon the floor beneath would drain outward through the opening 10.

While the operation of the mechanism will be understood from the foregoing description a recapitulation will be given. When there is no water flow from the water inlet 2 through the casing 1 to the water outlet 3, the piston 8 is in equilibrium and in the position shown in Fig. 1 of the drawings, being brought and kept in this position by the piston 9 which has the water pressure upon one side only. Upon a flow of water being set up, the difference in pressure upon the two sides of the piston will cause it to move along the slotted tube 11 until the pressure is again equalized on the both sides of the piston, that is, the piston 8 will be given a movement proportionate to the amount of water flow passing through the casing 1. Through the lever 20 and the link 25 the piston 9 is caused to move at the same time with the piston 8 but with a lesser amount of travel. The valve 5 moves with the piston 9. When the water flow is increased or decreased, the piston 8 will move backward and forward in correspondence to the difference in the water flow, and will also, through the connections, move the valve 5. When the water is shut off and the flow ceases the pressure on each side of the piston 8 will again be in equilibrium but owing to the water pressure being on one side only of the piston 9 will be moved to its extreme position, thus closing the valve 5 and bringing the piston 8 into position at the end of the slotted tube 11.

From all the foregoing it will be understood that a mechanism has been provided which realizes the objects of invention and the advantages herein set forth, together with other objects and advantages.

The invention, in its broader aspects, is not limited to the particular constructions shown, nor to any particular constructions by which it has been or may be carried into effect, as many changes may be made in the construction without departing from the main principles of the invention and without sacrificing its chief advantages.

What I do claim as my invention and desire to secure by Letters Patent, is:

1. An automatic valve mechanism for water heaters including in combination a fuel controlling valve, a casing provided with water inlet and outlet passages, two pistons within said casing out of alinement with each other but having parallel axes, one of said pistons being located between the water inlet and outlet passages and the other piston being connected to the fuel controlling valve, and connections between the said pistons located entirely within the casing.

2. An automatic valve mechanism for water heaters including in combination a fuel controlling valve, a casing provided with water inlet and outlet passages, two pistons within said casing out of alinement with each other but having parallel axes, one of said pistons being located between the water inlet and outlet passages and the other piston having a direct connection to the fuel controlling valve, and connections between the said pistons so that the movement of either piston serves to move the fuel controlling valve.

3. An automatic valve mechanism for water heaters including in combination a fuel controlling valve, a casing provided with water inlet and outlet passages, two pistons within said casing out of alinement with each other but having parallel axes, one of said pistons being located between the water inlet and outlet passages and the other piston being connected to the fuel controlling valve, and connections between said pistons located entirely within the casing and constructed so that one piston will have more movement than the other for a given movement of the fuel controlling valve.

4. An automatic valve mechanism for water heaters including in combination a fuel controlling valve, a casing provided with water inlet and outlet passages, two pistons within said casing out of alinement with each other but having parallel axes, one of said pistons being located between the water inlet and outlet passages and the other piston having a rigid direct connection to the fuel controlling valve, and connections between the said pistons so that the movement of either piston serves to move the fuel controlling valve, said connections being constructed so that there will be a greater movement of the indirectly connected valve and a less movement of the directly connected valve for a given movement of the fuel controlling valve.

5. An automatic valve mechanism for water heaters including in combination a fuel controlling valve, a casing provided with water inlet and outlet passages, two pistons of substantially equal effective areas within the said casing and out of alinement with each other but having parallel axes, one of said pistons being located between the water inlet and outlet passages and the other piston being connected to the fuel controlling valve, and connections between said pistons so that a less movement of the last named piston is required for a given movement of the fuel controlling valve than of the first named piston.

6. An automatic valve mechanism for water heaters including in combination a fuel controlling valve, a casing provided with water inlet and outlet passages, a piston chamber located within said casing in the line of the water flow between the inlet and outlet passages, a piston within the said chamber constructed to receive movement from the water flow, a second piston chamber out of alinement with said first piston chamber but with its axis parallel thereto, said second piston chamber communicating with the said casing at one end and with the atmosphere at the other end, a piston within the said chamber connected to the fuel controlling valve, and connections between the two pistons, said connections being located entirely within the casing.

7. An automatic valve mechanism for water heaters including in combination a fuel controlling valve, a casing provided with water inlet and outlet passages, a piston chamber located within said casing in the line of the water flow between the inlet and outlet passages, a piston within the said chamber constructed to receive movement from the water flow, a second piston chamber out of alinement with said first piston chamber but with its axis parallel thereto, said second piston chamber communicating with the said casing at one end and with the atmosphere at the other end, a piston of substantially the same area as the first mentioned piston within the said chamber and having a rigid connection to the fuel controlling valve, and connections between the two pistons located entirely within the casing, said connections being constructed so that a greater movement of the piston in the line of water flow is necessary to produce a given movement of the fuel controlling valve.

8. An automatic valve mechanism for water heaters, including in combination a fuel controlling valve, a casing having water inlet and outlet passages, a piston located at all times between said inlet and outlet passages, said piston having an opening therethrough, a tube fixed in the casing between the inlet and outlet passages and fitted to the opening in the piston, said tube having one or more longitudinal slots in its side and a closed end portion adapted to close the opening in the piston when the latter is in normal position, and connections between the piston and the fuel controlling valve.

9. An automatic valve mechanism for water heaters, including in combination a fuel controlling valve, a casing having water inlet and outlet passages, a piston located at all times between said inlet and outlet passages, said piston having an opening therethrough, a tube fixed in the casing between the inlet and outlet passages and fitted to the opening in the piston, said tube having one or more longitudinal slots in its side and a closed end portion adapted to close the opening in the piston when the latter is in normal position, connections between the piston and the fuel controlling valve, and means for restoring the piston to its normal position and closing the valve when the flow of water ceases.

10. An automatic valve mechanism for water heaters including in combination a fuel controlling valve, a casing having water inlet and outlet passages, two pistons located within said casing out of alinement with each other but having parallel axes, one of said pistons being located between the water inlet and outlet passages and the other piston having the water pressure on one side only, connections between the said pistons comprising a rod rigid with one of said pistons, a lever connected to said rod by a curved slot, a link between the said lever and the other piston, and connection from the said pistons to the fuel controlling valve.

11. An automatic valve mechanism for water heaters including in combination, a fuel controlling valve, a casing, a piston within the said casing having the water pressure upon one side and the atmospheric pressure upon the other side, a stem connecting the said piston and the fuel controlling valve, an upstanding boss on the casing through which said stem passes, and a drip guard on the piston arranged to cause any leakage of water past the piston to drip clear of the stem and the boss through which it passes.

12. An automatic valve mechanism for water heaters including in combination a fuel controlling pipe, a fuel controlling valve within the said pipe, a casing having water inlet and outlet passages, a piston chamber located within the casing between the said passages, a slotted tube within the piston chamber, a piston surrounding said slotted tube so as to receive a movement substantially proportional to the flow of water through the tube, a second piston chamber communicating with the said casing at one end and with the atmosphere at the other end, a piston within the said piston chamber, a rigid connection between the last mentioned piston and the fuel controlling valve, connections between the said pistons comprising a pin fixed relatively to one piston, a lever having a curved slotted end in which said pin works, and a link between the lever and the other piston.

In testimony whereof, I have signed my name to this specification, in the presence of two subscribing witnesses.

THOMAS WALTER PITCHER.

Witnesses:
L. E. SCOTT,
W. B. BOND.